US00RE46983E

(19) United States
(12) Reissued Patent
Kursun et al.

(10) Patent Number: US RE46,983 E
(45) Date of Reissued Patent: Aug. 7, 2018

(54) SYSTEM AND METHOD FOR RESEARCH REPORT GUIDED PROACTIVE NEWS ANALYTICS FOR STREAMING NEWS AND SOCIAL MEDIA

(71) Applicant: JPMorgan Chase Bank, N.A., New York, NY (US)

(72) Inventors: Eren Kursun, New York, NY (US); Gene Fernandez, Holmdel, NJ (US); Alex Berson, Dayton, NJ (US); Brian Goodman, Redding, CT (US)

(73) Assignee: JPMorgan Chase Bank, N.A., New York, NY (US)

(21) Appl. No.: 15/425,726

(22) Filed: Feb. 6, 2017

Related U.S. Patent Documents

Reissue of:
(64) Patent No.: 9,268,770
Issued: Feb. 23, 2016
Appl. No.: 13/972,743
Filed: Aug. 21, 2013

U.S. Applications:
(60) Provisional application No. 61/839,061, filed on Jun. 25, 2013.

(51) Int. Cl.
*G06F 17/27* (2006.01)
*G06F 17/28* (2006.01)

(52) U.S. Cl.
CPC ..... *G06F 17/2785* (2013.01); *G06F 17/28* (2013.01)

(58) Field of Classification Search
CPC ..... G06F 17/2785; G06F 17/28; G06F 17/30011; G06F 17/30516;
(Continued)

(56) References Cited

U.S. PATENT DOCUMENTS 5,458,235 A 10/1995 Stone
5,769,770 A 6/1998 Savage
(Continued)

OTHER PUBLICATIONS

Zong, et al., Semantics-Based Personlized Prefetching to Improve Web Performance, 2000, Proceedings of the 20th IEEE Conference on Distributed Computing Systems, pp. 1-21.
(Continued)

*Primary Examiner* — William H Wood
(74) *Attorney, Agent, or Firm* — Hunton Andrews Kurth LLP

(57) ABSTRACT

Systems and methods may provide proactive news analytics based on integrated prediction statements. Users may extract and collect conditional statements from research reports. A compiled list based on the processing/linking of statements for signal generation may then be created. Similarly, a list of counter statements that are assigned a conflict rating that specifies how much agreement/disagreement on a specific topic exists for the counter statement and the statement itself may be created. The custom library may have semantic capabilities to justify conditional statements in order to capture meaning and identify supporting news related to the statement. When a relevant event is detected that relates to a conditional statement, expected conclusions are linked, and customized indexes are calculated to allow for analysis of the relevant event.

6 Claims, 5 Drawing Sheets

(58) Field of Classification Search
CPC ..... G06F 17/30598; G06F 17/30734; G06F 17/30867; G06N 5/00
See application file for complete search history.

(56) References Cited

U.S. PATENT DOCUMENTS

| | | | | |
|---|---|---|---|---|
| 6,424,980 | B1 * | 7/2002 | Iizuka et al. | 715/206 |
| 6,807,544 | B1 * | 10/2004 | Morimoto et al. | |
| 7,454,430 | B1 * | 11/2008 | Komissarchik | G06F 17/30719 |
| 7,966,305 | B2 | 6/2011 | Olsen | |
| 8,260,664 | B2 * | 9/2012 | Vadlamani | G06F 17/30864 705/14.49 |
| 8,468,153 | B2 * | 6/2013 | Truve | H04W 4/20 707/723 |
| 8,606,681 | B2 | 12/2013 | O'Rourke | |
| 8,793,173 | B2 | 7/2014 | Berkman et al. | |
| 8,812,647 | B1 | 8/2014 | Jain et al. | |
| 8,849,826 | B2 | 9/2014 | Minh | |
| 8,909,771 | B2 | 12/2014 | Heath | |
| 9,514,133 | B1 * | 12/2016 | Kursun | G06F 17/30598 |
| 9,753,913 | B1 * | 9/2017 | Kursun | G06F 17/2785 |
| 2003/0135445 | A1 * | 7/2003 | Herz | G06Q 40/04 705/37 |
| 2005/0055275 | A1 | 3/2005 | Newman et al. | |
| 2006/0242040 | A1 | 10/2006 | Rader | |
| 2007/0094219 | A1 * | 4/2007 | Kipersztok | G06Q 10/04 706/52 |
| 2009/0036102 | A1 * | 2/2009 | Ho | 455/412.2 |
| 2009/0265307 | A1 | 10/2009 | Reisman et al. | |
| 2009/0306907 | A1 | 12/2009 | Nicolov et al. | |
| 2009/0306967 | A1 | 12/2009 | Nicolov et al. | |
| 2009/0318777 | A1 * | 12/2009 | Kameyama | 600/301 |
| 2009/0319342 | A1 | 12/2009 | Shilman et al. | |
| 2010/0121857 | A1 | 5/2010 | Elmore et al. | |
| 2010/0241498 | A1 * | 9/2010 | Chung | G06F 17/30893 705/14.5 |
| 2010/0299301 | A1 * | 11/2010 | Busch et al. | 706/46 |
| 2011/0093420 | A1 | 4/2011 | Rothenberg et al. | |
| 2011/0173638 | A1 * | 7/2011 | Nakamae | 719/318 |
| 2011/0213742 | A1 * | 9/2011 | Lemmond et al. | 706/13 |
| 2012/0246054 | A1 | 9/2012 | Sastri | |
| 2012/0259617 | A1 | 10/2012 | Indukuri et al. | |
| 2012/0296845 | A1 | 11/2012 | Andrews et al. | |
| 2013/0091117 | A1 | 4/2013 | Minh | |
| 2013/0103667 | A1 | 4/2013 | Minh | |
| 2013/0226842 | A1 * | 8/2013 | Chu et al. | 706/12 |
| 2014/0114941 | A1 * | 4/2014 | Ahlberg et al. | 707/706 |
| 2014/0164342 | A1 | 6/2014 | Liapis | |
| 2014/0215351 | A1 | 7/2014 | Gansca et al. | |
| 2014/0292643 | A1 | 10/2014 | Kim et al. | |
| 2015/0100144 | A1 | 4/2015 | Lee et al. | |

OTHER PUBLICATIONS

Zhang, et al., Informing the Curious Negotiator: Automatic News Extraction from the Internet, 2006, Data Mining, Springer, pp. 176-191.

* cited by examiner

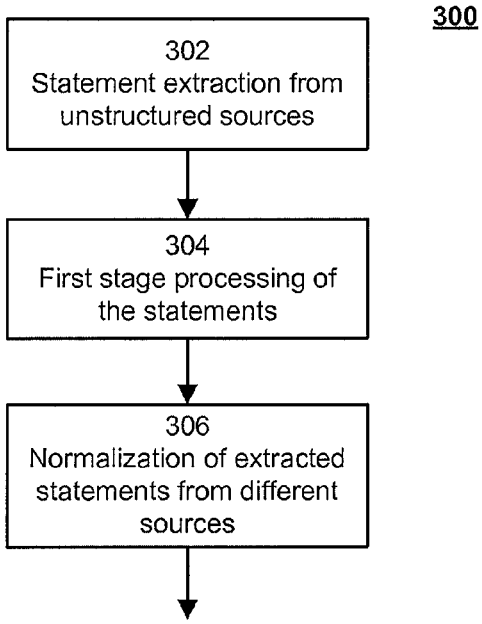
FIG. 3A
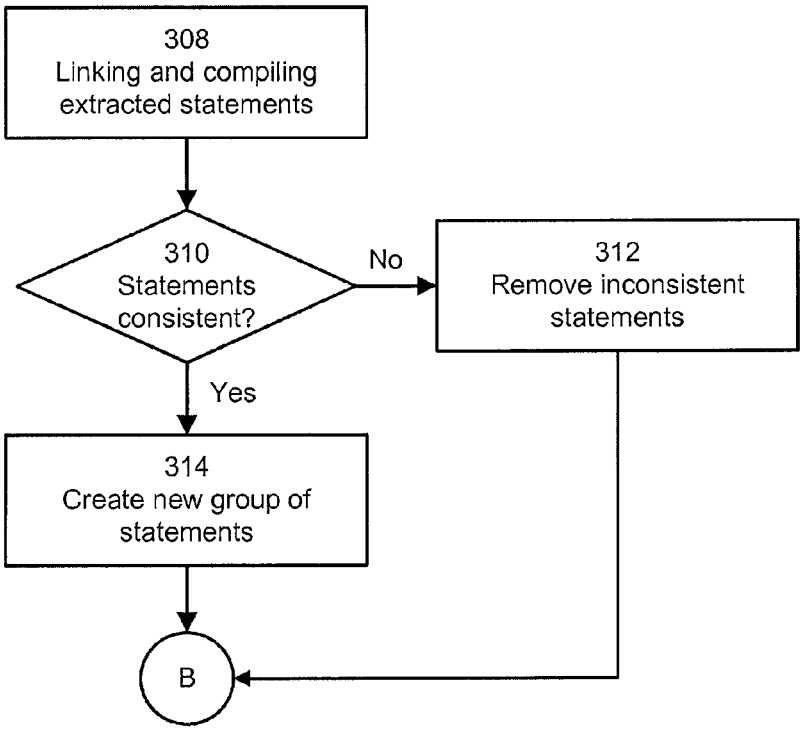

SYSTEM AND METHOD FOR RESEARCH REPORT GUIDED PROACTIVE NEWS ANALYTICS FOR STREAMING NEWS AND SOCIAL MEDIA

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATIONS

This application claims the benefit of U.S. Provisional Application No. 61/839,061, filed Jun. 25, 2013. The contents of which are hereby incorporated by reference in their entirety.

The application is related to co-pending U.S. patent application Ser. No. 13/972,388, filed on Aug. 21, 2013, and entitled "System and Method for Customized Sentiment Signal Generation through Machine Learning Based Text Analytics." The contents which are hereby incorporated by reference in their entirety.

BACKGROUND

There are many sources for news and information available today. The sheer volume of sources and information available, both in print and on-line, can be overwhelming. The advent of social media has added an entirely new layer to sources of information. Even more troublesome can be monitoring these sources to find important information, or at least information important to the reader or the reader's industry. Typical analysis tools do not always find relevant material and are not customized to a particular user.

Research reports typically incorporate conditional statements such as: if market growth in a sector stays below 2% by Q2 2013, company X stock is expected to be $abc or as new patent law changes are likely to be effective in Q3 2013, company Y stock can see $xyz by Q4. Such predictions may be difficult to process for a variety of reasons, such as the statements not directly sentiment related, they are not real time, and they can affect a range of entities. However, by the time the event mentioned happens, the competitive advantage diminishes. Furthermore, these statements are hard to be considered after a period of time after publication of the report.

These and other deficiencies exist.

SUMMARY OF THE PREFERRED EMBODIMENTS

An exemplary embodiment includes a computer implemented method for extracting one or more statements from one or more unstructured sources wherein the extracted statements comprise predictive and conditional statements pertaining to an event in the future; normalizing, by the computer processor, the extracted statements; linking the extracted statements from the one or more unstructured sources based on one or more factors; testing the extracted statements for consistency, wherein inconsistent statements are removed; and creating, by the computer processor, a list of custom keywords based on the extracted statements.

The computer implemented method may further include associating a sentiment position signal with each of the extracted statements; creating a custom keyword library and natural language processing structures based on each sentiment position signal; linking the custom keyword library and the natural language processing structures based on a semantic analysis; prefetching data from a stream of news, social media, and unstructured sources wherein the data is prefetched based on potential matching of the data to items in the custom keyword library and the natural language processing structures; analyzing the prefetched data based on the custom keyword library and the natural language processing structures for matching items; processing the matching items based upon sentiment and confidence scoring; and creating a customized output.

Another exemplary embodiment includes a computer implemented method for acquiring a plurality of statements from multiple input channels, wherein each of the plurality of statements relates to an event that is predicted to occur in the future and each of the multiple input channels has an inherent confidence score based on historical performance of each of the multiple input channels relating to statements and predicted events; processing each of the plurality of statements, wherein the processing comprises one or more of: linking data structures with time stamps for action, assigning importance, and delineating consequences; normalizing each of the plurality of statements to account for differences in structure and format of the multiple input channels; linking and compiling each of the plurality of statements through one or more of hierarchy, timeline, entity connectivity, and causality implications; verifying each of the plurality of statements for consistency in a multi-dimensional space; removing inconsistent statements that fall below an established threshold for consistency; calculating a unique confidence score based on a matching between two or more of the plurality of statements; forming a new group of statements based on remaining statements, wherein the new group of statements is weighted based on the inherent confidence score; creating a custom keyword library based on the new group of statements; creating natural language processing structures for statement justification; associating sentiment signals with the new group of statements; linking the custom keyword library and the natural language processing structures; prefetching signals from a stream comprising one or more sources comprising news, social media, and research reports; checking each prefetched signal for a potential match to the custom keyword library and the natural language processing structures, wherein upon a determination of a match the potential match becomes a matched signal; and performing a confidence check on each matched signal based on the weighting based on the inherent confidence score.

Another exemplary embodiment includes a computer implemented method for acquiring a plurality of statements related to a specific entity from multiple input channels, wherein each of the plurality of statements relates to an event that is predicted to occur in the future and each of the multiple input channels has an inherent confidence score based on historical performance associated therewith; processing each of the plurality of statements, wherein the processing comprises one or more of: linking data structures with time stamps for action, assigning importance, and delineating consequences; normalizing each of the plurality of statements to account for differences in structure and format of the multiple input channels; linking and compiling each of the plurality of statements through one or more of hierarchy, timeline, entity connectivity, and causality implications; verifying each of the plurality of statements for consistency in a multi-dimensional space; removing inconsistent statements falling below an established threshold of consistency; calculating a unique confidence score based on a matching between two or more of the plurality of statements; forming a new group of statements based on remaining statements; creating a custom keyword library based on the new group of statements; creating natural language processing structures for statement justification; associating sentiment signals with the new group of statements; linking the custom keyword library and the natural language processing structures; prefetching signals from a stream comprising one or more sources comprising news, social media, and research reports; weighting each prefetched signal based on the inherent confidence score; checking each prefetched signal for a potential match to the custom keyword library and the natural language processing structures, wherein upon a determination of a match the potential match becomes a matched signal; performing a confidence check comprising assignment of a confidence score on each matched signal based on the weighting; and combining each matched signal to create a position signal for the specific entity using the weighting.

Another exemplary embodiment includes a computer implemented method for acquiring a plurality of statements from multiple input channels, wherein each of the plurality of statements relates to an event that is predicted to occur in the future and each of the multiple input channels has an inherent confidence score based on historical performance associated therewith; processing each of the plurality of statements, wherein the processing comprises one or more of: linking data structures with time stamps for action, assigning importance, and delineating consequences; normalizing each of the plurality of statements to account for differences in structure and format of the multiple input channels; linking and compiling each of the plurality of statements through one or more of hierarchy, timeline, entity connectivity, and causality implications; verifying each of the plurality of statements for consistency in a multi-dimensional space; calculating a unique confidence score based on a matching between two or more of the plurality of statements; removing inconsistent statements based on an established threshold, wherein statements below the threshold are removed; forming a new group of statements based on remaining statements following the removing; creating a custom keyword library based on the new group of statements; creating natural language processing structures for statement justification; associating sentiment signals with the new group of statements; linking the custom keyword library and the natural language processing structures; prefetching signals from a stream comprising one or more sources comprising news, social media, and research reports; checking each prefetched signal for a potential match to the custom keyword library and the natural language processing structures, wherein upon a determination of a match the potential match becomes a matched signal; applying machine learning based on each matched signal, wherein the machine learning comprises identifying indicators in the matched signal to identify additional signals to pre-fetch; and prefetching, from the stream one or more additional signals based on the machine learning.

In exemplary embodiments, the preceding methods may be performed using a system with a processor and a memory comprising computer-readable instructions which when executed by the processor cause the processor to perform the method steps.

These and other embodiments and advantages of the preferred embodiments will become apparent from the following detailed description, taken in conjunction with the accompanying drawings, illustrating by way of example the principles of the various exemplary embodiments.

BRIEF DESCRIPTION OF THE DRAWINGS

FIGS. 3A and 3B are flow charts of a method for proactive news analytics on integrated prediction statements in accordance with an exemplary embodiment.

DETAILED DESCRIPTION OF THE PREFERRED EMBODIMENTS

Figure 1:
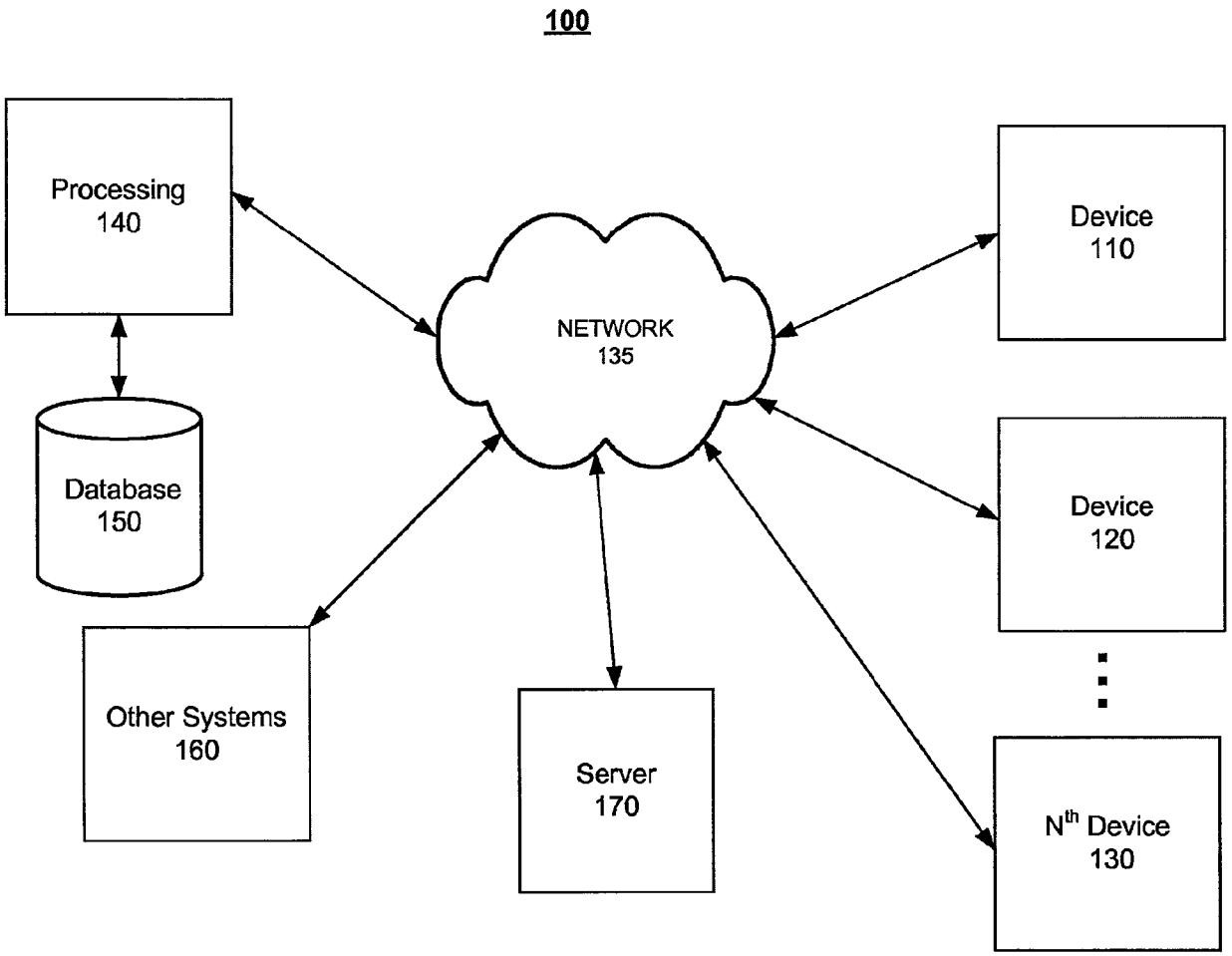
FIG. 1 depicts a system in accordance with an exemplary embodiment.

It will be readily understood by those persons skilled in the art that the embodiments of the inventions described herein are capable of broad utility and application.

Accordingly, while the invention is described herein in detail in relation to the exemplary embodiments, it is to be understood that this disclosure is illustrative and exemplary of embodiments are described to provide an enabling disclosure. Accordingly, the disclosure is not intended to be construed to limit the embodiments or otherwise to exclude any other such embodiments, adaptations, variations, modifications and equivalent arrangements.

The following descriptions are provided of different configurations and features according to exemplary embodiments. These configurations and features may relate to providing financial services to customers. While certain nomenclature and types of applications/hardware are described, other names and application/hardware usage is possible and the nomenclature provided is done so by way of non-limiting examples only. Further while particular embodiments are described, it should be appreciated that the features and functions of each embodiment may be combined in any combination as is within the capability of one of ordinary skill in the art. The attached Figures provide additional details of the various embodiments. It should also be appreciated that these exemplary embodiments are provided as non-limiting examples only.

Exemplary embodiments may be applicable to financial institutions. Accordingly, examples used herein may refer to financial institutions or topics related thereto. Financial institutions, as used herein, may include institutions that provide financial services to their members or customers. For example, financial institutions may include, but are not limited to banks, credit unions, trust companies, mortgage loan companies, insurance companies, investment banks, underwriters, and brokerage firms. It should be appreciated that the exemplary embodiment may be extended to other industries and areas beyond financial institutions. Therefore, the examples used herein are exemplary and meant to be non-limiting.

According to exemplary embodiments, proactive news analytics may be produced based on integrated prediction statements. As described in the background above, many unstructured sources, such as, but not limited to, research reports, typically incorporate conditional statements. To take advantage of these conditional statements exemplary embodiments may allow users to extract and collect such conditional statements from the research reports. The statements may be extracted and collected either directly by the analysts, or automatically by text analytics, or extracted by the user through text tear outs. Following this process, an extracted statements flat list may be created and then used for proactive news processing. Statements from multiple reports from different sources and different levels of the hierarchy (such as statement on a large geographic area that affects predictions on companies in a particular country in that geographic area) may be merged.

Thus, a compiled list based on the processing/linking of statements for signal generation is created and maintained. Similarly maintained may be a list of counter statements that are assigned a conflict rating that specifies how much agreement/disagreement on a specific topic exists for the counter statement and the statement itself. A custom library for streaming news may then be maintained. The custom library may not be purely keyword based but may have semantic capabilities to justify conditional statements in order to capture meaning and identify supporting news related to the statement. When a relevant event is detected that relates to a conditional statement, expected conclusions are linked, and customized indexes are calculated to allow for analysis of the relevant event. The goal being to proactive be aware of the relevant event rather than waiting for the news to be pushed and reacting. Instead, according to exemplary embodiments, it is possible to get in front of the events to act accordingly to take advantage of the predicted event based on the conditional statement.

The exemplary methods and systems provided herein are provided by way of example, as there are a variety of ways to carry out the methods disclosed herein. The methods as shown in the Figures may be executed or otherwise performed by one or a combination of various systems as described herein. Each block shown in the Figures may represent one or more processes, methods, and/or subroutines carried out in the exemplary method. Each block may have an associated processing machine or the blocks depicted may be carried out through one processor machine. Furthermore, while the steps may be shown in a particular order, it should be appreciated that the steps may be conducted in a different order.

While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that exemplary systems may be integrated into and run on a computer, which may include a programmed processing machine having one or more processors. Such a processing machine may execute instructions stored in a memory to process the data and execute the methods described herein. Furthermore, exemplary systems may be integrated into and run on one or more computer networks which may each have one or more computers associated therewith. Exemplary systems may be cloud computing type systems.

As noted above, the processing machine executes the instructions that are stored in the memory or memories or persistent or non-transitory data storage devices to process data. This processing of data may be in response to commands by a user or users of the processing machine, in response to previous processing, in response to a request by another processing machine and/or any other input, for example. As described herein, a module performing functionality may have a processor.

FIG. 1 is a system according to exemplary embodiments. System 100 may provide various functionality and features associated with the program. More specifically, system 100 may include a device 110, a second device 120, and an Nth device 130, a network 135, a processing module 140, a database 150, other systems 160, and a server 170.

According to exemplary embodiments, the system 100 may be configured to carry out the methods as described herein. The system 100 may have device 110 associated therewith. A second device 120 and an Nth device 130 may be further associated with the system 100. The devices 110, 120, and 130 may each be a processing machine. Each device 110, 120, and 130 may include software and/or modules to implement the methods described herein according to exemplary embodiments. Each device 110, 120, and 130 may provide processing, display, storage, communications, and execution of commands in response to inputs from a user thereof and respond to requests from the software and/or modules. It should be appreciated that even though the devices 110, 120, and 130 may be referred to in the subsequent description, the system 100 may use any combination of these devices ranging from one device 110 to multiple devices 110, 120, and 130.

The devices 110, 120, and 130 may each serve as a client side. Each device 110, 120, and 130 may be a "fat" client, such that the majority of the processing may be performed on the client. Alternatively, the device 110, 120, and 130 may each be a "thin" client, such that the majority of the processing may be performed in the other components of the system 100. The devices 110, 120, and 130 may be configured to perform other functions and processing beyond the methods described herein. The devices 110, 120, and 130 may each be a part of a larger system. The devices 110, 120, and 130 may be multi-functional in operation. The devices 110, 120, and 130 may each support the operation and running of one or more applications or programs.

Each device 110, 120, and 130 may have a display and an input device associated therewith. The display may be monochrome or color. For example, the display may be a plasma, liquid crystal, or cathode ray tube type display. The displays may be touch screen type displays. The devices 110, 120, and 130 may have more than one display. The multiple displays may be different types of displays. The display may have sub-displays there on. For example, the device 110, 120 and 130 may have a large display surface. The display for the user interface may occupy a portion or less than the whole of the large display surface.

The input device may be a single device or a combination of input devices. For example, the input devices may include a keyboard, both full-sized QWERTY and condensed, a numeric pad, an alpha-numeric pad, a track ball, a touch pad, a mouse, selection buttons, and/or a touch screen. As described above, the display may serve as an input device through using or incorporating a touch screen interface. The devices 110, 120, and 130 may include other devices such as a printer and a device for accepting deposits and/or dispensing currency and coins.

The device 110, 120, and 130 may have one or more cameras, optical sensors, or other sensing devices. The sensors may be computer controlled and may capture digital images.

According to some embodiments, the devices 110, 120, and 130 may be portable electronic devices or mobile electronic devices. The user may interact with the portable electronic device through various input devices (not shown). For example, the portable electronic device may have a display screen to convey information to the user. The display may be a color display. For example, the display may be a Liquid Crystal Display ("LCD"). The portable electronic device may have one or more input devices associated with it. For example, the portable electronic device may have an alphanumeric keyboard, either physical or virtual, for receiving input. The portable electronic device may have a QWERTY style keyboard, either physical or virtual. The portable electronic device may have a pointing device associated therewith, such as, for example, a trackball or track wheel. The portable electronic device may receive inputs through a touch screen or other contact interface. In some embodiments, gesture based input may be used. A combination of input types may be used. As described above, the portable electronic device may have communication capabilities over both cellular and wireless type networks to transmit/receive data and/or voice communications.

The portable electronic device, by way of non-limiting examples, may include such portable computing and communications devices as mobile phones (e.g., cell or cellular phones), smart phones (e.g., iPhones, Android based phones, or Blackberry devices), personal digital assistants (PDAs) (e.g., Palm devices), laptops, netbooks, tablets, or other portable computing devices. These portable electronic devices may communicate and/or transmit/receive data over a wireless signal. The wireless signal may consist of Bluetooth, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Transmission Control Protocol/Internet (TCP/IP) Protocols, or other protocols and/or systems suitable for transmitting and receiving data from the portable electronic device. The portable electronic device may use standard wireless protocols which may include IEEE 802.11a, 802.11b, 802.11g, and 802.11n. Such portable electronic devices may be Global Positioning System (GPS) capable. GPS is a satellite based system which sends a signal allowing a device to define its approximate position in a coordinate system on the earth. That is, the portable electronic device may receive satellite positioning data and display the location on the earth of the portable electronic device using GPS. Other location systems may be used. The portable electronic device may include one or more computer processors and be capable of being programmed to execute certain tasks.

The device 110, 120, and 130 may establish communications with other parts of the system 100 over a network 135. Upon successful initiation of communications between the and the network 135 and another part of the system 100, such as, for example, processing module 140 and database 150, data may be exchanged between device 110, 120, and 130 and the particular element over the network 135. Data may be transmitted from device 110, 120, and 130. Data may be transmitted from the other part of the system 100 to the device 110, 120, and 130.

The devices 110, 120, and 130 may be communicatively coupled to the network 135. Accordingly, the devices 110, 120, and 130 may be geographically dispersed. Conversely, two or more of devices 110, 120, and 130 may be located in close proximity. For example, the devices may be located within or near an office complex. Wherever the location of the device 110, 120, and 130, it may still be able to communicatively couple with the network 135 and the components of the system 100.

In some embodiments, the devices 110, 120, and 130 may be other types of computing platforms, such as, for example, a desktop computer or a laptop computer. The devices 110, 120, and 130 may be a combination of computing devices.

The devices 110, 120, and 130 may each be remotely accessible. Remote access may be used to configure, trouble-shoot, and wipe the contents of the device, for example.

Network 135 may be a computer based network, with one or more servers and/or computer processors. For example, network 135 may be the Internet or a network connected to the Internet. The network 135 may be a satellite or cellular based network. Information and data may be exchanged through the network 135 between the various components of the system 100. In alternative embodiments, the network 135 may be a local area network within the financial institution that may be connected to or interface with the Internet. It should be appreciated that the network 135 may be a combination of local area networks, wide area networks, and external networks, which may be connected to the Internet.

The processing module 140 may be communicatively coupled to the network 135. The processing module 140 may perform operations associated with the establishment, configuration, and application of the programs accordingly to exemplary embodiments. The processing module 140 may consist of one or more servers and/or general purpose computers, each having one or more computer processors associated therewith.

The processing module 140 may have a database 150 communicatively coupled thereto. The database 150 may contain data and information used by the system 100. For example, the database 150 may store the customized library's and other data structures described here. Additional information may be contained therein related to the operation and administration of the system 100.

The database 150 may include any suitable data structure to maintain the information and allow access and retrieval of the information. For example, the database may keep the data in an organized fashion. The database 150 may be a database, such as an Oracle database, a Microsoft SQL Server database, a DB2 database, a MySQL database, a Sybase database, an object oriented database, a hierarchical database, a flat database, and/or another type of database as may be known in the art that may be used to store and organize rule data as described herein.

The database 150 may be stored in any suitable storage device. The storage device may include multiple data storage devices. The multiple data storage devices may be operatively associated with the database 150. The storage may be local, remote, or a combination thereof with respect to the database. The database 150 may utilize a redundant array of disks (RAID), striped disks, hot spare disks, tape, disk, or other computer accessible storage. In one or more embodiments, the storage may be a storage area network (SAN), an internet small computer systems interface (iSCSI) SAN, a Fiber Channel SAN, a common Internet File System (CIFS), network attached storage (NAS), or a network file system (NFS). The database may have back-up capability built-in. Communications with the database 150 may be over a network, such as the network 135, or communications may be over a direct connection between the database 150 and the processing module 140, as depicted in FIG. 1. Data may be transmitted and/or received from the database 150. Data transmission and receipt may utilize cabled network or telecom connections such as an Ethernet RJ 15/Category 5 Ethernet connection, a fiber connection, a traditional phone wireline connection, a cable connection or other wired network connection. A wireless network may be used for the transmission and receipt of data.

The system 100 may have other systems 160 associated therewith. These other systems 160 may include various data collection and support systems used by the entity to carry out a variety of functions. The other systems 160 may include equipment and other assets of the entity. The other systems 160 may be associated with third party entities.

It should be appreciated that the server 170 may interact with other parts of the system 100, such as the devices 110, 120, and 130, as well as the processing module 140 and the other systems 160. The server 170 may be a single server or it may be multiple servers. For example, the server 170 may represent multiple servers located in different locations. The server 170 may be a part of a cloud computing system. The server 170 may server a variety of roles in the system 100. In some embodiments, the server 170 may contain the processing module 140 as well as the database 150. In some embodiments, the database 150 may be directly coupled to the server 170.

The server 170 may have one or more storage devices associated therewith. The storage may be local, remote, or a combination thereof with respect to the server 170. The storage may utilize a redundant array of disks (RAID), striped disks, hot spare disks, tape, disk, or other computer accessible storage. In one or more embodiments, the storage may be a storage area network (SAN), an Internet small computer systems interface (iSCSI) SAN, a Fiber Channel SAN, a common Internet File System (CIFS), network attached storage (NAS), or a network file system (NFS). The storage may have back-up capability built-in. The back-up capability of the storage may be used to archive image data for later use. The back-up capability may be used for recovery of data in the event of a failure of the storage.

In some embodiments, the server 170 may be associated with one or more third party entities whereas other portions of the system 100 (e.g., device 110, 120, and 130, processing module 140, database 150, and other systems 160) may be associated with a single entity according to exemplary embodiments, such as, for example, a financial institution.

Figure 2:
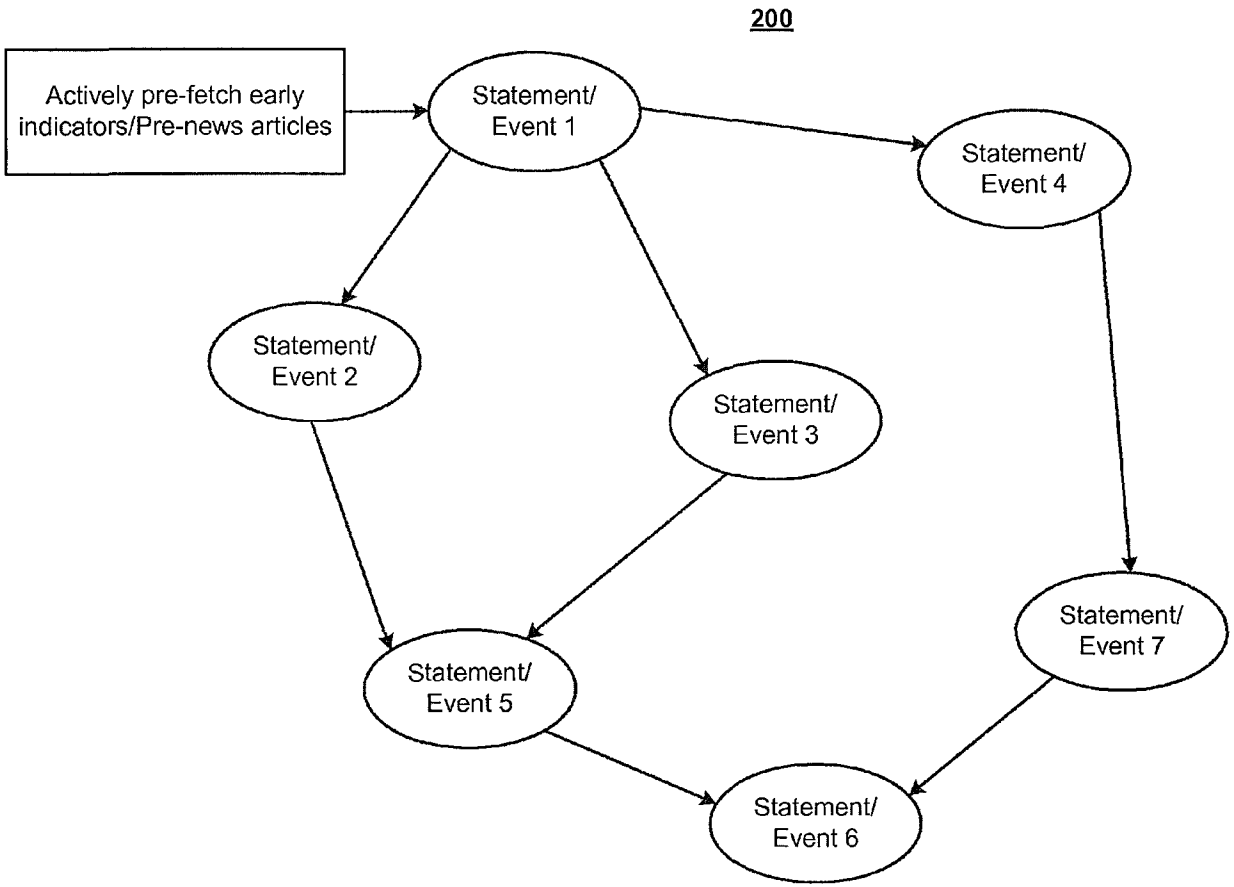
FIG. 2 is an example of research report position statements and prefetching news associated with statements according to an exemplary embodiment.

FIG. 2 is an example of research report position statements and prefetching news associated with statements according to an exemplary embodiment. It should be appreciated that FIG. 2 is but one embodiment, as this figure can have multiple embodiments. For example, the plot 200 may represent the interconnection between a prefetched news article and a series of statements and events. In some embodiments, the news article may lead to the statements and events depicted (that is, the event described in the news article may lead to the statements and events). This embodiment may be used for machine learning following the occurrence of an event to track the result of the event and to learn the keywords, expressions, and sentiment that resulted in an effort to better predict events in the future. In another embodiment, the plot may be of expected events and the event's connectivity may be specified by a research report or analyst. In a different embodiment, a compilation of extracted sentences can be produce this corresponding sequence of events, streaming data and interconnectivity information.

Figure 3B:
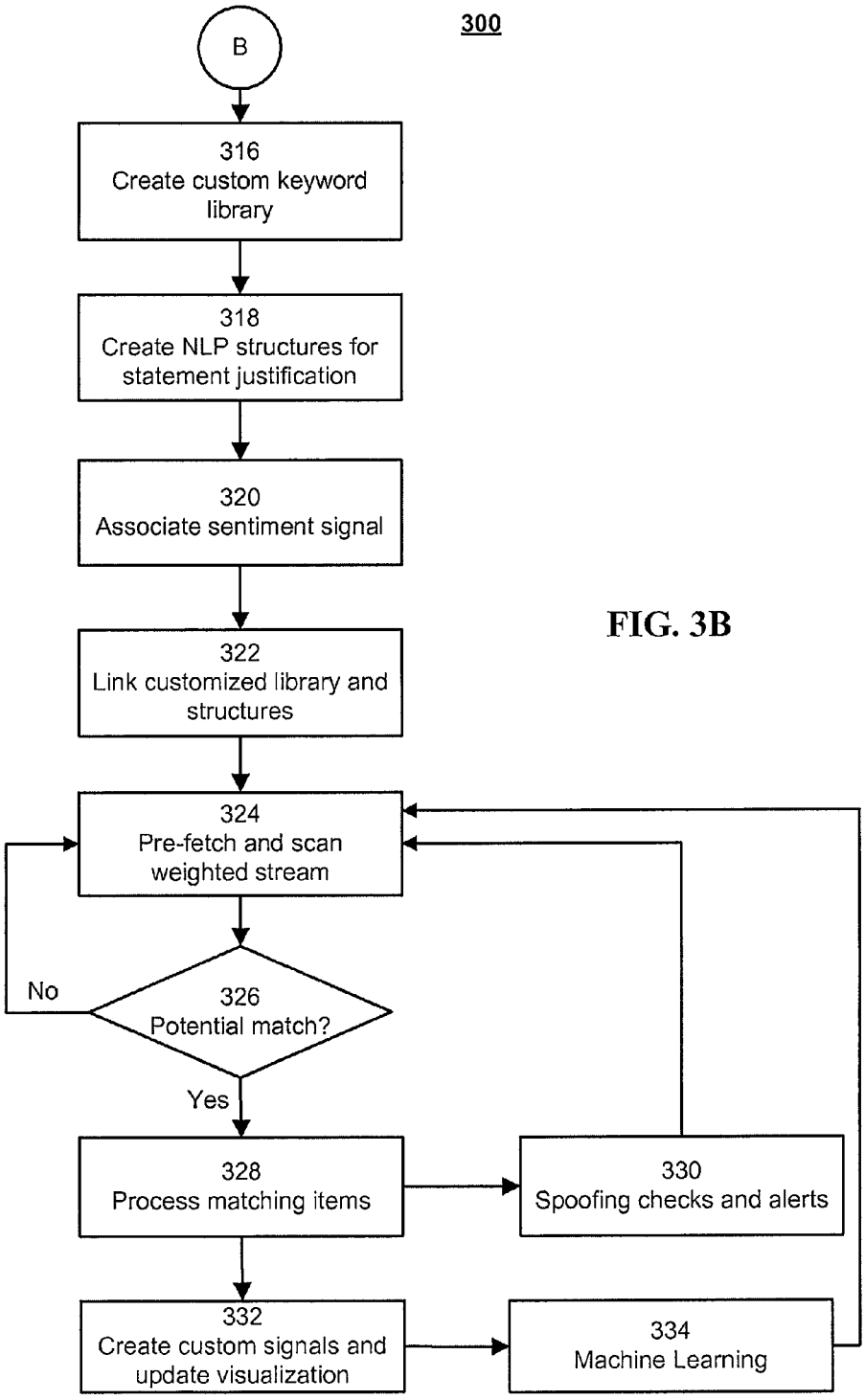

FIGS. 3A and 3B are flow charts of a method for proactive news analytics on integrated prediction statements according to exemplary embodiments of the invention.

At block 302, statement extraction from unstructured sources is performed. For example, the sources may include research reports. The statement extraction may include analyst or externally provided readily available statements, statements extracted by the user (e.g. tear outs from unstructured text), automatically extracted statements from variety of sources, and user generated statements.

In one embodiment, position statements may be extracted from a research report for a specific equity. Such statements may include expected behavior of the stock, expected events directly related to the stock, expected events in the market, expected events relating to competitors, prediction statements, etc. For example, if the stock is downgraded, the statements may include things like "expected retirement of the CEO", "indications of slow-down in the segment", "expected product release by a competitor", etc. Each of these statements may have different time stamps and confidence levels in the future. Such statements may typically be found in the abstract section of a position report or in other sections and different types of reports and documents.

In another embodiment, analysts may provide flow charts that describe in greater detail the justification for position and associated weights for statements. Such statements can be extracted and input to the system through a variety of ways, including but not limited to: (i) text analytics based extraction of statements from research reports, (ii) analyst provided statements (explicitly provided by analyst), (iii) user tear outs from research reports and other sources, and (iv) user generated expectation or prediction statements.

In another embodiment, analysts may provide quantitative models, flow charts, or predictive statements, or a combination of these items to guide the decision process. Such data may be machine readable and can be used to guide the ingestion and prefetching of streaming data sources.

At block 304, first stage processing of the extracted statements is performed. This may include categorization of the extracted statements. As part of this processing, linking data structures with time stamps for action, importance, and consequences is performed. In one embodiment, custom weights may be assigned by analysts. In another embodiment, a custom weight may be calculated depending on the confidence level for the statement and the analyst.

At block 306, normalization of the extracted statements from different sources is performed within each category from block 304. In one embodiment, for example, the user may extract statements from various research reports from different investment banks or various analysts within the investment bank or research institution, from news sources, institution reports, social media and financial blog statements. As each of these sources have different format and structural characteristics, data from the different sources is processed to be normalized. Such normalization also includes normalization of expected time frames, currencies, market and financial metrics, etc.

At block 308, linking and compiling of the extracted statements is performed. The linking and compiling may be performed through hierarchy, timeline, entity connectivity, and causality implications. In one embodiment, the hierarchy may refer to a market segment and specific equities in the segment. In another embodiment, a timeline may connect months to quarters. Entity connectivity may reflect direct competitors in a specific segment, etc.

At block 310, the extracted statements are checked for consistency. Consistency may be checked in multi-dimensional space of time, causality, and hierarchy. In one embodiment, a unique confidence score may be calculated when statements from different sources match. This confidence score may then be used to prefetch news and supporting data in the later parts of the method. In cases where the statements have low consistency scores, two embodiments may exist: in one embodiment, the inconsistent statements may be pruned such that highest confidence statement or source remains; in the second embodiment, separate statement and position flows are generated and both inconsistent statements are tracked for prefetching.

At block 312, if the statements are not consistent, the statements are removed. A threshold may be set for consistency. The statements may be removed if they fall below the threshold. Such thresholds may be machine learned for the industry/segment and for specified risk levels. The thresholds can also be overwritten by the user.

At block 314, a new group of statements is formed. The new group may be formed if the statements are above the threshold.

At block 316, a custom keyword library is created. The custom library may be created for pre-fetching of streaming news, social media, and pre-news for statement. In one embodiment, each word in normalized and a compiled statement list may be processed, analog words/statements may be created and processed similarly. In another embodiment, one such library could contain "company name", "lawsuit", "patent", "litigation", etc. In another embodiment, specific names (such as person, place, product, etc) can be associated with the statements and placed in the keyword library.

The custom keyword library may have a hierarchy such that each statement has its own keyword, expression, or natural language processing structures to track. The composite library may have a combination of the compiled statements such the structures may overlap (e.g., keyword, expression, timeline, natural language processing structures, etc.).

In another embodiment, quantitative support engines provided by analysts or other sources can be used to guide the prefetching process by using the causal relationships. If a causal relationship is identified between a news/event and a statement such filters can be used to do prefetching. In other embodiments, such prefetching sources can be machine learned post-event in the first instance and can be applied to other instances.

At block 318, natural language processing (NLP) structures for statement justification are created. These NLP structures may be created for streaming news, social media, and pre-news for statement. The NLP structures may serve to provide a way to identify analogous expressions for the contents of the custom keyword library. The NLP structures may serve to provide a way to identify analogous expressions for the contents of the custom keyword library. In this step, the relationships between some of the keywords may be further defined and new relationship constructs may be added.

At block 320, sentiment signals are associated with the statements supported by the news. In one embodiment, the sentiment signal may be multiplied by the factor to determine the impact on position statement as described in FIG. 4. The sentiment or position signal may also be multiplied by the confidence score of the channel.

At block 322, the customized library and NLP structures are linked. The linking may be performed based on semantic analysis of the event to be supported with statement predications, such as expected timelines and confidence scores.

At block 324, weighted stream items are pre-fetched and scanned. The stream items may include streaming news, social media, research reports from the same institution or others, institutional reports, and unstructured sources. The stream items may include streaming news, social media, and unstructured sources. The pre-fetching is done proactively with justification engines based on the custom keyword library and structures created above. The pre-fetching enables exemplary embodiments to find and identify precursor events and other items that indicate the predicted event may occur. In this way, the predicted event may be anticipated. For example, many times events and other items may occur and be reported as a fact that the event occurred. The actual news story may happen later, such as a day or two afterwards or a result of the event may occur. The goal may be to find the precursors and other tells that are indicative of the actual event.

Each source in the stream may be weighted. The weighting may be done by a user based on preferences. In some embodiments, each source may be given equal weight. In other embodiments, different sources may be weighted differently. The weighting may be applied during the processing for confidence as described below. In another embodiment, the weights may be dynamically updated by the machine learning algorithm based on the historical data.

At block 326, the potential match of the items is individually checked. The potential match may be checked with the structure and library engines. A match may be greater than a specified threshold.

At block 328, if the item matches, then the item is processed. A confidence check may be performed and a multi-channel scan may be done to identify supporting items. The weighting of the source may be applied as part of the confidence check to increase or decrease the confidence for each matching item.

If the item does not match, it is discarded and other items are fetched and scanned.

At block 330, spoofing checks are performed and alerts generated. The spoofing checks may be performed by requesting confirmation through reported news sources and independent channels.

At block 332, custom signals are created from matching items and the visualization for the user is updated. Reporting of the emerging pre-news and updated signals along with the associated sentiment may be performed.

At block 334, machine learning is implemented. The method 300 may implement machine learning to pre-fetch particular signals for future tracking. For each event with an impact greater than a predetermined threshold, the method may identify indicators, such as other events, new, and/or keywords that may be used as part of the learning to identify particular items to pre-fetch.

In another embodiment, the system may learn from high impact events by retroactively scanning the data to find sources for prefetching and other early indicators. Statistical analysis of the data may be performed to identify the custom library associated with the event, different sources of data for prefetching of the news and other sources. All of these entries may be stored in a database that is dynamically updated based on observed events and is used to retrain the system.

Figure 4:
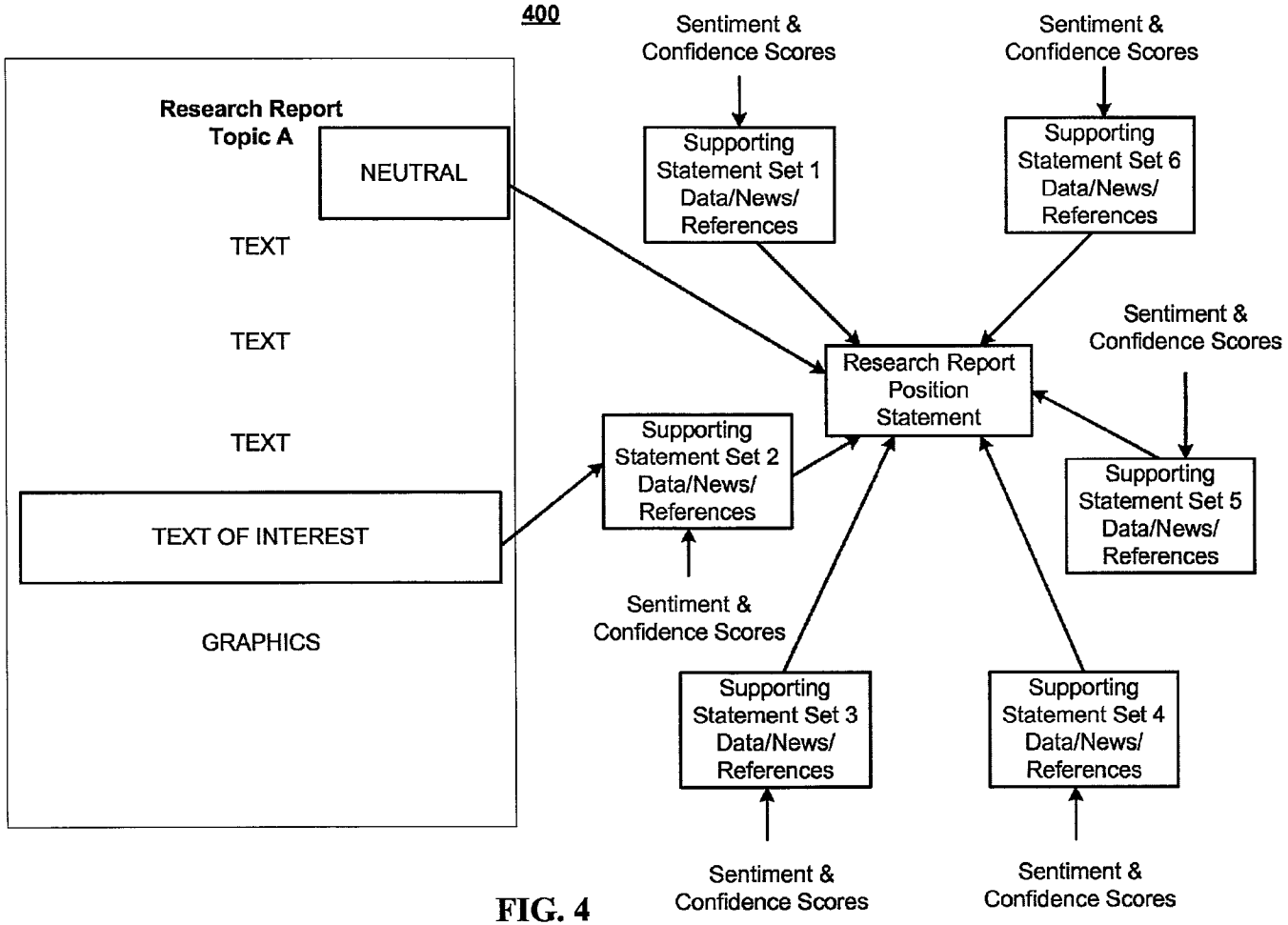
FIG. 4 is an example diagram of supporting statements according to exemplary embodiments.

FIG. 4 is an example diagram of supporting statements according to exemplary embodiments. FIG. 4 is meant to be exemplary and non-limiting. The diagram 400 depicts the interrelationship of a tear out of a statement from a research report that is linked with the supporting statements from other sources, such as news/data/references. Each supporting statement has a sentiment and confidence score assigned as described herein. Each supporting statement is sentiment scored and linked to its source. The diagram is also dynamically updated.

Hereinafter, aspects of implementation of the inventions will be described. As described above, the method of the invention may be computer implemented as a system. The system of the invention or portions of the system of the invention may be in the form of a "processing machine," for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above in the flowcharts. Such a set of instructions for performing a particular task may be characterized as a program, software program, or simply software.

The description of exemplary embodiments describes servers, portable electronic devices, and other computing devices that may include one or more modules, some of which are explicitly depicted in the figures, others are not. As used herein, the term "module" may be understood to refer to executable software, firmware, hardware, and/or various combinations thereof. It is noted that the modules are exemplary. The modules may be combined, integrated, separated, and/or duplicated to support various applications. Also, a function described herein as being performed at a particular module may be performed at one or more other modules and/or by one or more other devices (e.g., servers) instead of or in addition to the function performed at the particular module. Further, the modules may be implemented across multiple devices and/or other components local or remote to one another. Additionally, the modules may be moved from one device and added to another device, and/or may be included in both devices. It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., servers, portable electronic devices, client devices, computers, etc.) separately. The functions described as being performed at various components may be performed at other components, and the various components may be combined and/or separated. Other modifications also may be made.

According to exemplary embodiments, the systems and methods may be computer implemented using one or more computers, incorporating computer processors. The computer implementation may include a combination of software and hardware. The computers may communicate over a computer based network. The computers may have software installed thereon configured to execute the methods of the exemplary embodiments. The software may be in the form of modules designed to cause a computer processor to execute specific tasks. The computers may be configured with hardware to execute specific tasks. As should be appreciated, a variety of computer based configurations are possible.

The processing machine described above may also utilize any of a wide variety of other technologies including a special purpose computer, a computer system including a microcomputer, mini-computer or mainframe for example, a programmed microprocessor, a micro-controller, a PICE (peripheral integrated circuit element), a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices for example capable of implementing the steps of the process of the invention.

It is appreciated that in order to practice the method of the invention as described above, it is not necessary that the processors and/or the memories of the processing machine be physically located in the same geographical place. For example, each of the processors and the memories and the data stores used in the invention may be located in geographically distinct locations and connected so as to communicate in any suitable manner. Additionally, it is appreciated that each of the processor and/or the memory and/or data stores may be composed of different physical pieces of equipment. Accordingly, it is not necessary that the processor be one single piece of equipment in one location and that the memory be another single piece of equipment in another location. For example, it is contemplated that the processor may be two or more pieces of equipment in two or more different physical locations. These two or more distinct pieces of equipment may be connected in any suitable manner. Additionally, the memory may include two or more portions of memory in two or more physical locations. Additionally, the data storage may include two or more components or two or more portions of memory in two or more physical locations.

To explain further, processing as described above is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions. It is also appreciated that the data storage performed by two distinct components as described above may, in accordance with a further embodiment of the invention, be performed by a single component. Further, the data storage performed by one distinct component as described above may be performed by two distinct components.

Further, various technologies may be used to provide communication between the various processors and/or memories, as well as to allow the processors and/or the memories of the invention to communicate with any other entity; e.g., so as to obtain further instructions or to access and use remote memory stores, for example. Such technologies used to provide such communication might include a network, such as a computer network, for example, the Internet, Intranet, Extranet, LAN, or any client server system that provides communication of any capacity or bandwidth, for example. Such communications technologies may use any suitable protocol such as TCP/IP, UDP, or OSI, for example. It should be appreciated that examples of computer networks used in the preceding description of exemplary embodiments, such as the Internet, are meant to be non-limiting and exemplary in nature.

As described above, a set of instructions is used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming or any other suitable programming form. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. For example, written lines of programming code or source code, in a particular programming language, are converted to machine language using a compiler, assembler or interpreter. The machine language is binary coded machine instructions that are specific to a particular type of processing machine, e.g., to a particular type of computer, for example. The computer understands the machine language.

Any suitable programming language may be used in accordance with the various embodiments of the invention. Illustratively, the programming language used may include assembly language, ActionScript, Ada, APL, Basic, C, C++, C#, COBOL, Ceylon, Dart, dBase, F#, Fantom, Forth, Fortran, Go, Java, Jquery, Modula-2, .NET, Objective C, Opa, Pascal, Prolog, Python, REXX, Ruby, Visual Basic, X10, and/or JavaScript, for example. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, e.g., the software for example, that enables the computer operating system to perform the operations described above may be contained on any of a wide variety of computer readable media, as desired. Further, the data for example processed by the set of instructions might also be contained on any of a wide variety of non-transitory media or medium. For example, the particular medium, e.g., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmissions or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provide the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is contemplated that the user interface of the invention might interact, e.g., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

While the embodiments have been particularly shown and described within the framework of financial services, it will be appreciated that variations and modifications may be effected by a person of ordinary skill in the art without departing from the scope of the invention. Furthermore, one of ordinary skill in the art will recognize that such processes and systems do not need to be restricted to the specific embodiments described herein. Other embodiments, combinations of the present embodiments, and uses and advantages of the present invention will be apparent to those skilled in the art from consideration of the specification and practice of the invention disclosed herein. The specification and examples should be considered exemplary.

What is claimed is:

[1. A computer implemented method, comprising:

extracting, by a computer processor, one or more statements from one or more unstructured sources wherein the extracted statements comprise predictive and conditional statements pertaining to an event in the future;

normalizing, by the computer processor, the extracted statements;

linking the extracted statements from the one or more unstructured sources based on one or more factors;

testing the extracted statements for consistency, wherein inconsistent statements are removed;

creating, by the computer processor, a list of custom keywords based on the extracted statements;

ranking the extracted statements based on a strength of agreement; and creating an alternative conditional statement flow chart upon the extracted statements having a high degree of disagreement.]

[2. The method of claim 1, further comprising:

associating a sentiment position signal with each of the extracted statements;

creating a custom keyword library and natural language processing structures based on each sentiment position signal;

linking the custom keyword library and the natural language processing structures based on a semantic analysis;

prefetching data from a stream of news, social media, and unstructured sources wherein the data is prefetched based on potential matching of the data to items in the custom keyword library and the natural language processing structures;

analyzing the prefetched data based on the custom keyword library and the natural language processing structures for matching items;

processing the matching items based upon sentiment and confidence scoring; and creating a customized output.]

[3. The method of claim 2, wherein the potential matching of the data to items in the custom keyword library and the natural language processing structures is measured at least in terms comprising one or more of: entity matching, keyword matching, and timeline matching.]

[4. The method of claim 2, further comprising:

verifying the matching items using a set of cross-channel checks that comprise verifying each matching item against one or more other independent sources.]

[5. The method of claim 2, wherein the stream is a weighted stream with weights applied to each source in the stream.]

[6. The method of claim 2, further comprising:

implementing machine based learning for future prefetching based on an accuracy of the matching items and the event.]

[7. The method of claim 2, further comprising:

applying a feedback mechanism that extracts information from the one or more unstructured sources pertaining to the occurrence of the event.]

[8. The method of claim 1, wherein the unstructured sources comprise research reports.]

[9. The method of claim 1, wherein the one or more factors comprise one or more of: the conditions or predictions that the extracted statements refer to, an expected timeline, an expected cause, an expected dependency, a keyword or keywords, and a list of tracked entities.]

[10. The method of claim 1, further comprising:

creating a linked and timeline based flow diagram based on the extracted statements and the event.]

[11. A system, comprising:

a processor; and a memory comprising computer-readable instructions which when executed by the processor cause the processor to perform the steps comprising:

extracting one or more statements from one or more unstructured sources wherein the extracted statements comprise predictive and conditional statements pertaining to an event in the future;

normalizing the extracted statements;

linking the extracted statements from the one or more unstructured sources based on one or more factors;

testing the extracted statements for consistency, wherein inconsistent statements are removed;

creating a list of custom keywords based on the extracted statements;

ranking the extracted statements based on a strength of agreement; and creating an alternative conditional statement flow chart if the extracted statements have a high degree of disagreement.]

[12. The system of claim 11, further comprising:

associating a sentiment position signal with each of the extracted statements;

creating a custom keyword library and natural language processing structures based on each sentiment position signal;

linking the custom keyword library and the natural language processing structures based on a semantic analysis;

prefetching data from a stream of news, social media, and unstructured sources wherein the data is prefetched based on potential matching of the data to items in the custom keyword library and the natural language processing structures;

analyzing the prefetched data based on the custom keyword library and the natural language processing structures for matching items;

processing the matching items based upon sentiment and confidence scoring; and creating a customized output.]

[13. The system of claim 12, further comprising:

verifying the matching items using a set of cross-channel checks that comprise verifying each matching item against one or more other independent sources.]

[14. The system of claim 12, wherein the stream is a weighted stream with weights applied to each source in the stream.]

[15. The system of claim 12, further comprising:

implementing machine based learning for future prefetching based on an accuracy of the matching items and the event.]

[16. The system of claim 12, further comprising:

applying a feedback mechanism that extracts information from the one or more unstructured sources pertaining to the occurrence of the event.]

[17. The system of claim 11, wherein the unstructured sources comprise research reports.]

[18. The system of claim 11, wherein the one or more factors comprise one or more of: the conditions or predictions that the extracted statements refer to, an expected timeline, an expected cause, an expected dependency, a keyword or keywords, and a list of tracked entities.]

[19. The system of claim 11, further comprising:

creating a linked and timeline based flow diagram for the extracted statements and the event.]

[20. A computer implemented method, comprising:

acquiring, by a computer processor, a plurality of statements from multiple input channels, wherein each of the plurality of statements relates to an event that is predicted to occur in the future and each of the multiple input channels has an inherent confidence score based on historical performance of each of the multiple input channels relating to statements and predicted events;

processing, by the computer processor, each of the plurality of statements, wherein the processing comprises one or more of: linking data structures with time stamps for action, assigning importance, and delineating consequences;

normalizing each of the plurality of statements to account for differences in structure and format of the multiple input channels;

linking and compiling, by the computer processor, each of the plurality of statements through one or more of hierarchy, timeline, entity connectivity, and causality implications;

verifying each of the plurality of statements for consistency in a multi-dimensional space;

removing inconsistent statements that fall below an established threshold for consistency;

calculating, by the computer processor, a unique confidence score based on a matching between two or more of the plurality of statements;

forming a new group of statements based on remaining statements, wherein the new group of statements is weighted based on the inherent confidence score;

creating, by the computer processor, a custom keyword library based on the new group of statements;

creating, by the computer processor, natural language processing structures for statement justification;

associating sentiment signals with the new group of statements;

linking, by the computer processor, the custom keyword library and the natural language processing structures;

prefetching signals, by the computer processor, from a stream comprising one or more sources comprising news, social media, and research reports;

checking, by the computer processor, each prefetched signal for a potential match to the custom keyword library and the natural language processing structures, wherein upon a determination of a match the potential match becomes a matched signal; and performing, by the computer processor, a confidence check on each matched signal based on the weighting based on the inherent confidence score.]

[21. The computer implemented method of claim 20, wherein the multiple input channels comprise: user inputs, text tear outs from documents, automatically extracted statements from documents, news sources, and inputs from individual analysts.]

[22. The computer implemented method of claim 21, wherein the inputs from individual analysts comprise machine readable data comprising one or more of flow charts, quantitative models, predictive statements, or a combination thereof.]

[23. The computer implemented method of claim 20, wherein the multi-dimensional space comprises time, causality, and hierarchy.]

[24. The computer implemented method of claim 20, further comprising:

normalizing each word in the new group of statements; and compiling a statement list with analog words and statements based on the new group of statements; and adding the statement list to the custom keyword library.]

[25. The computer implemented method of claim 20, wherein the natural language processing structures identify analogous expressions to contents of the custom keyword library.]

[26. The computer implemented method of claim 20, further comprising:

retroactively scanning the stream, after the event has occurred, for signals related to occurrence of the event;

processing, by a computer processor, the signals related to the occurrence;

performing, by the computer processor, a statistical analysis of the signals;

identifying a custom library of keywords from the statistical analysis;

storing the custom library of keywords from the statistical analysis;

implementing machine learning based on the custom library of keywords and the occurrence to improve future prefetching of signals.]

27. A computer implemented method, comprising:

acquiring, by a computer processor, a plurality of statements related to a specific entity from multiple input channels, wherein each of the plurality of statements relates to an event that is predicted to occur in the future and each of the multiple input channels has an inherent confidence score based on historical performance associated therewith;

processing, by the computer processor, each of the plurality of statements, wherein the processing comprises one or more of: linking data structures with time stamps for action, assigning importance, and delineating consequences;

normalizing each of the plurality of statements to account for differences in structure and format of the multiple input channels;

linking and compiling, by the computer processor, each of the plurality of statements through one or more of hierarchy, timeline, entity connectivity, and causality implications;

verifying each of the plurality of statements for consistency in a multi-dimensional space;

removing inconsistent statements falling below an established threshold of consistency;

calculating, by the computer processor, a unique confidence score based on a matching between two or more of the plurality of statements;

forming a new group of statements based on remaining statements;

creating, by the computer processor, a custom keyword library based on the new group of statements;

creating, by the computer processor, natural language processing structures for statement justification;

associating sentiment signals with the new group of statements;

linking, by the computer processor, the custom keyword library and the natural language processing structures;

prefetching signals, by the computer processor, from a stream comprising one or more sources comprising news, social media, and research reports;

weighting each prefetched signal based on the inherent confidence score;

checking, by the computer processor, each prefetched signal for a potential match to the custom keyword library and the natural language processing structures, wherein upon a determination of a match the potential match becomes a matched signal;

performing, by the computer processor, a confidence check comprising assignment of a confidence score on each matched signal based on the weighting; and combining each matched signal to create a position signal for the specific entity using the weighting.

28. The computer implemented method of claim 27, wherein the multiple input channels comprise: user inputs, text tear outs from documents, automatically extracted statements from documents, news sources, and inputs from individual analysts.

29. The computer implemented method of claim 27, wherein the multi-dimensional space comprises time, causality, and hierarchy.

30. A computer implemented method, comprising:

acquiring, by a computer processor, a plurality of statements from multiple input channels, wherein each of the plurality of statements relates to an event that is predicted to occur in the future and each of the multiple input channels has an inherent confidence score based on historical performance associated therewith;

processing, by the computer processor, each of the plurality of statements, wherein the processing comprises one or more of: linking data structures with time stamps for action, assigning importance, and delineating consequences;

normalizing each of the plurality of statements to account for differences in structure and format of the multiple input channels;

linking and compiling, by the computer processor, each of the plurality of statements through one or more of hierarchy, timeline, entity connectivity, and causality implications;

verifying each of the plurality of statements for consistency in a multi-dimensional space;

calculating, by the computer processor, a unique confidence score based on a matching between two or more of the plurality of statements;

removing inconsistent statements based on an established threshold, wherein statements below the threshold are removed;

forming a new group of statements based on remaining statements following the removing;

creating, by the computer processor, a custom keyword library based on the new group of statements;

creating, by the computer processor, natural language processing structures for statement justification;

associating sentiment signals with the new group of statements;

linking, by the computer processor, the custom keyword library and the natural language processing structures;

prefetching signals, by the computer processor, from a stream comprising one or more sources comprising news, social media, and research reports;

checking, by the computer processor, each prefetched signal for a potential match to the custom keyword library and the natural language processing structures, wherein upon a determination of a match the potential match becomes a matched signal;

applying, by the computer processor, machine learning based on each matched signal, wherein the machine learning comprises identifying indicators in the matched signal to identify additional signals to prefetch; and prefetching, from the stream, by the computer processor, one or more additional signals based on the machine learning.

31. The computer implemented method of claim 30, wherein the multiple input channels comprise: user inputs, text tear outs from documents, automatically extracted statements from documents, news sources, and inputs from individual analysts.

32. The computer implemented method of claim 30, wherein the multi-dimensional space comprises time, causality, and hierarchy.

* * * * *